United States Patent
Qiu et al.

(10) Patent No.: US 9,432,409 B2
(45) Date of Patent: Aug. 30, 2016

(54) APPARATUS AND METHOD FOR MANAGING EMERGENCY CALLS

(75) Inventors: Chaoxin Qiu, Austin, TX (US); Arshad Khan, Austin, TX (US); Niral Sheth, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1173 days.

(21) Appl. No.: 12/402,959

(22) Filed: Mar. 12, 2009

(65) Prior Publication Data

US 2010/0232403 A1     Sep. 16, 2010

(51) Int. Cl.
*H04L 12/28*     (2006.01)
*H04L 29/06*     (2006.01)
*H04M 11/04*     (2006.01)

(52) U.S. Cl.
CPC ....... *H04L 65/1016* (2013.01); *H04L 65/1006* (2013.01); *H04L 65/1043* (2013.01); *H04M 11/04* (2013.01); *H04L 65/1046* (2013.01)

(58) Field of Classification Search
USPC .................................................. 370/351, 352
See application file for complete search history.

(56) References Cited

U.S. PATENT DOCUMENTS

| | | | |
|---|---|---|---|
| 2004/0203575 A1* | 10/2004 | Chin et al. ................. | 455/404.1 |
| 2007/0060097 A1 | 3/2007 | Edge et al. | |
| 2007/0121642 A1* | 5/2007 | Battin et al. ............... | 370/395.2 |
| 2007/0254625 A1* | 11/2007 | Edge ......................... | 455/404.1 |
| 2008/0008157 A1 | 1/2008 | Edge et al. | |
| 2008/0117809 A1* | 5/2008 | Wang et al. ................. | 370/229 |
| 2008/0310599 A1* | 12/2008 | Purnadi et al. ................. | 379/37 |
| 2009/0147929 A1* | 6/2009 | Zhao .............................. | 379/46 |
| 2009/0176474 A1* | 7/2009 | Bajko ......................... | 455/404.1 |
| 2010/0118741 A1* | 5/2010 | Youn et al. .................... | 370/259 |
| 2010/0124897 A1* | 5/2010 | Edge ......................... | 455/404.1 |
| 2010/0246780 A1* | 9/2010 | Bakker et al. .................. | 379/38 |
| 2011/0141979 A1* | 6/2011 | Keller et al. .................. | 370/328 |
| 2011/0165856 A1* | 7/2011 | You et al. .................. | 455/404.1 |

* cited by examiner

*Primary Examiner* — Farah Faroul
(74) *Attorney, Agent, or Firm* — Hanley, Flight & Zimmerman, LLC

(57) ABSTRACT

A system that incorporates teachings of the present disclosure may include, for example, a network element operably couplable to an Internet Protocol Multimedia Subsystem network where the network element has a controller to receive an SIP request associated with a call, determine whether the SIP request comprises an identifier associated with an Emergency Call Session Control Function (E-CSCF) where the identifier was added to the SIP request by the E-CSCF, and provide the call to an emergency network when the identifier is associated with the E-CSCF. Other embodiments are disclosed.

25 Claims, 6 Drawing Sheets

200

400

APPARATUS AND METHOD FOR MANAGING EMERGENCY CALLS

FIELD OF THE DISCLOSURE

The present disclosure relates generally to communication systems and more specifically to an apparatus and method for managing emergency calls.

BACKGROUND

Many emergency response services utilize Time Division Multiplexing-based systems as an interface for their public safety answering points. Such E911 networks often have a limited allocation of E911 trunks. IP Multimedia Subsystem networks can utilize Emergency Call Session Control Functions to connect with the E911 trunks.

DETAILED DESCRIPTION

One embodiment of the present disclosure can entail computer-readable storage medium of a Media Gateway Control Function (MGCF) operably coupled to an Internet Protocol Multimedia Subsystem (IMS) network, where the storage medium includes computer instructions to receive at the MGCF an SIP INVITE associated with a call, determine whether the SIP INVITE has a header associated with emergency calls, determine whether the header comprises an identifier associated with an Emergency Call Session Control Function (E-CSCF) where the identifier was added to the header by the E-CSCF, and provide the call to an emergency network when the identifier is associated with the E-CSCF.

Another embodiment of the present disclosure can entail a network element operably couplable to an Internet Protocol Multimedia Subsystem network, the network element having a controller to receive an SIP request associated with a call, determine whether the SIP request comprises an identifier associated with an Emergency Call Session Control Function (E-CSCF) where the identifier was added to the SIP request by the E-CSCF, and provide the call to an emergency network when the identifier is associated with the E-CSCF.

Yet another embodiment of the present disclosure can entail a network element operably couplable to an Internet Protocol Multimedia Subsystem (IMS) network, the network element having a controller adapted to receive from a Proxy Call Session Control Function an SIP request associated with a call, add an identifier to the SIP request where the identifier is associated with the network element and identifies the network element as an Emergency Call Session Control Function, provide the SIP request with the identifier to a Breakout Gateway Control Function, where the call is provided to an emergency network based on a recognition of the identifier.

Yet another embodiment of the present disclosure can entail a communication device for an Internet Protocol Multimedia Subsystem (IMS) network, the device having a controller adapted to register with a Proxy Call Session Control Function (P-CSCF) using an SIP request to communicate with an emergency network where an identifier is added to the SIP request by an Emergency Call Session Control Function (E-CSCF) where the identifier is associated with the E-CSCF and where the call is provided to the emergency network based on a recognition of the identifier by a Media Gateway Control Function (MGCF).

Yet another embodiment of the present disclosure can entail receiving at a Media Gateway Control Function an SIP INVITE associated with a call, determining whether the SIP INVITE comprises an identifier associated with an Emergency Call Session Control Function (E-CSCF) wherein the identifier was added to the header by the E-CSCF and where the SIP INVITE was provided by the E-CSCF, and providing the call to an emergency network when the identifier is associated with the E-CSCF.

Figure 1:
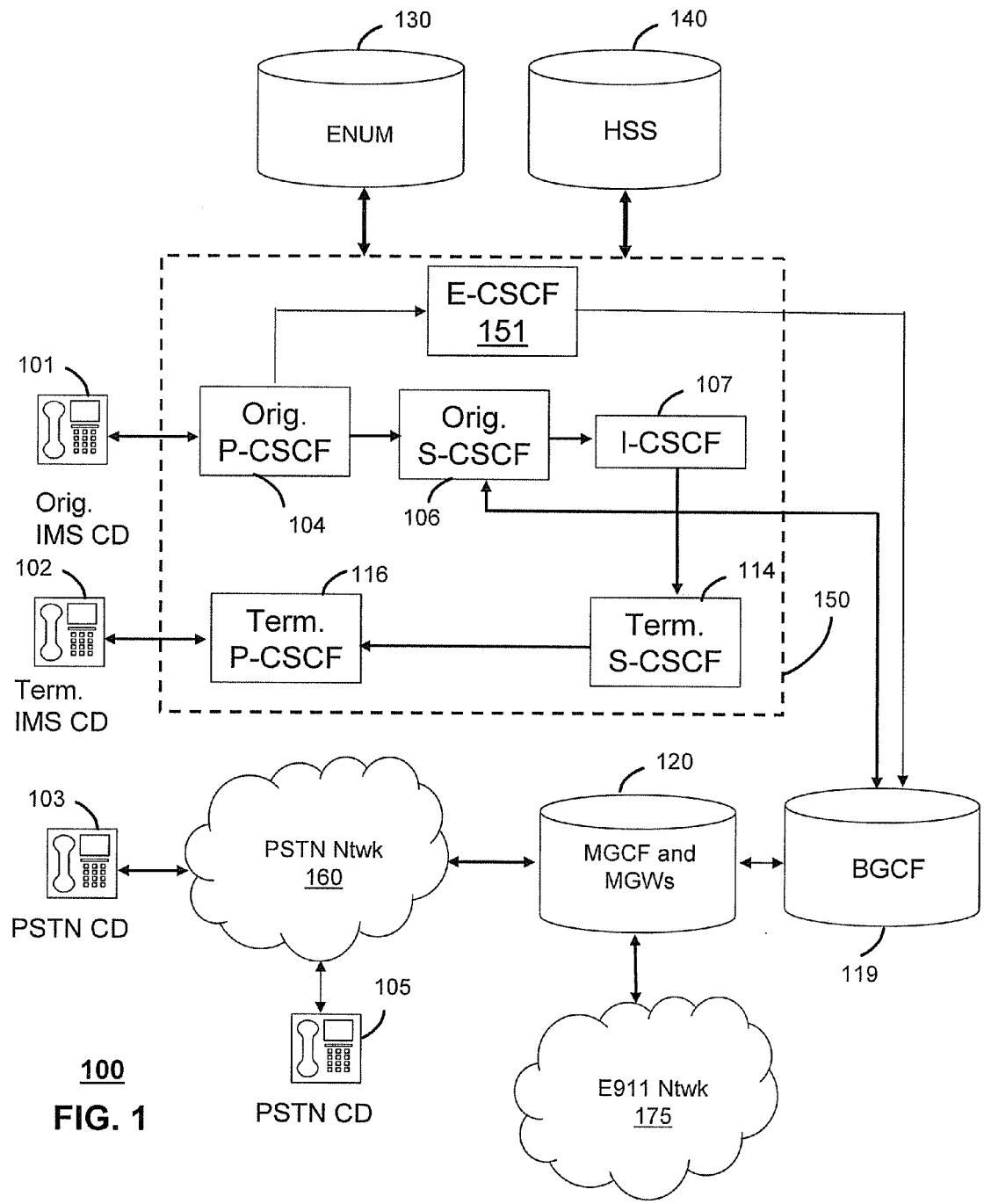
FIGS. 1-3 depict illustrative embodiments of communication systems that provide media services.

FIG. 1 depicts an illustrative embodiment of a communication system 100. employing an IP Multimedia Subsystem (IMS) network architecture to facilitate the combined services of circuit-switched and packet-switched systems. Communication system 100 can be overlaid or operably coupled with other communication systems including PSTN systems, iTV systems and the like, for communication of voice, video, and/or other data.

Communication system 100 can comprise a Home Subscriber Server (HSS) 140, a tElephone NUmber Mapping (ENUM) server 130, and other common network elements of an IMS network 150. The IMS network 150 can establish communications between IMS compliant communication devices (CD) (such as IMS User Endpoint Devices as described in the IMS standard) 101, 102, Public Switched Telephone Network (PSTN) CDs (such as Customer Premises Equipment) 103, 105, and combinations thereof by way of a Media Gateway Control Function (MGCF) 120 coupled to a PSTN network 160.

IMS CDs 101, 102 can register with the IMS network 150 by contacting a Proxy Call Session Control Function (P-CSCF) which communicates with a corresponding Serving CSCF (S-CSCF) to register the CDs with the HSS 140. To initiate a communication session between CDs, an originating IMS CD 101 can send a Session Initiation Protocol (SIP INVITE) message or request to an originating P-CSCF 104 which communicates with a corresponding originating S-CSCF 106. The originating S-CSCF 106 can submit queries to the ENUM system 130 to translate an E.164 telephone number in the SIP INVITE to a SIP Uniform Resource Identifier (URI) if the terminating communication device is IMS compliant.

The SIP URI can be used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE to the terminating S-CSCF 114. The terminating S-CSCF 114 can then identify a terminating P-CSCF 116 associated with the terminating CD 102. The P-CSCF 116 then signals the CD 102 to establish communications.

If the terminating communication device is instead a PSTN CD such as references 103 or 105, the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD by common means over the PSTN network 160.

The aforementioned communication process is symmetrical. Accordingly, the terms "originating" and "terminating" in FIG. 1 are interchangeable. It is further noted that communication system 100 can be adapted to support video conferencing by way of common protocols such as H.323. In addition, communication system 100 can be adapted to provide the IMS CDs 201, 203 with the multimedia and Internet services of an IPTV or other network having multimedia capability.

In one embodiment, some of the network elements of the system 100 can be coupled to one or more computing devices, a portion of which can operate as a web server for providing portal services over an Internet Service Provider (ISP) network to wireline media devices or wireless communication devices by way of a wireless access base station operating according to common wireless access protocols such as Wireless Fidelity (WiFi), or cellular communication technologies (such as GSM, CDMA, UMTS, WiMAX, Software Defined Radio or SDR, and so on).

In one embodiment, system 100 can utilize Media Gateways (MGWs) to provide connectivity for legacy Time Division Multiplexing (TDM)-based services, such as traditional PSTN, GSM, and E911 PSAPs. The MGWs can provide inter-working between RTP/UDP/IP voice packet streams and circuit-based TDM voice trunks. For instance, a set of TDM trunks can be specialized to connect to an E911 tandem switch (such as an E911 selective router) that provides connectivity and E911 call routing to appropriate PSAP offices. Coupling with a set of MGWs, MGCF 120, including its signaling gateway functions, can control the MGs for bearer path management and can provide call signaling interworking between the SIP-based VoIP networks and the legacy ISUP-based TDM networks.

As an example, system 100 can utilize Emergency Call Session Control Function (E-CSCF) 151 for processing E911 calls to an E911 trunk (such as in E911 network 175) by way of MGCF 120. System 100 can provide for the E-CSCF 151 handling the E911 calls while normal outgoing calls are handled by S-CSCF 106 through use of identification information associated with the E-CSCF that will be recognized by an MGCF that is responsible for controlling E911 trunks. In one embodiment, the IMS UEs can make 911 call via E-CSCF even if the UEs have not successfully registered with the IMS system 100.

Figure 2:
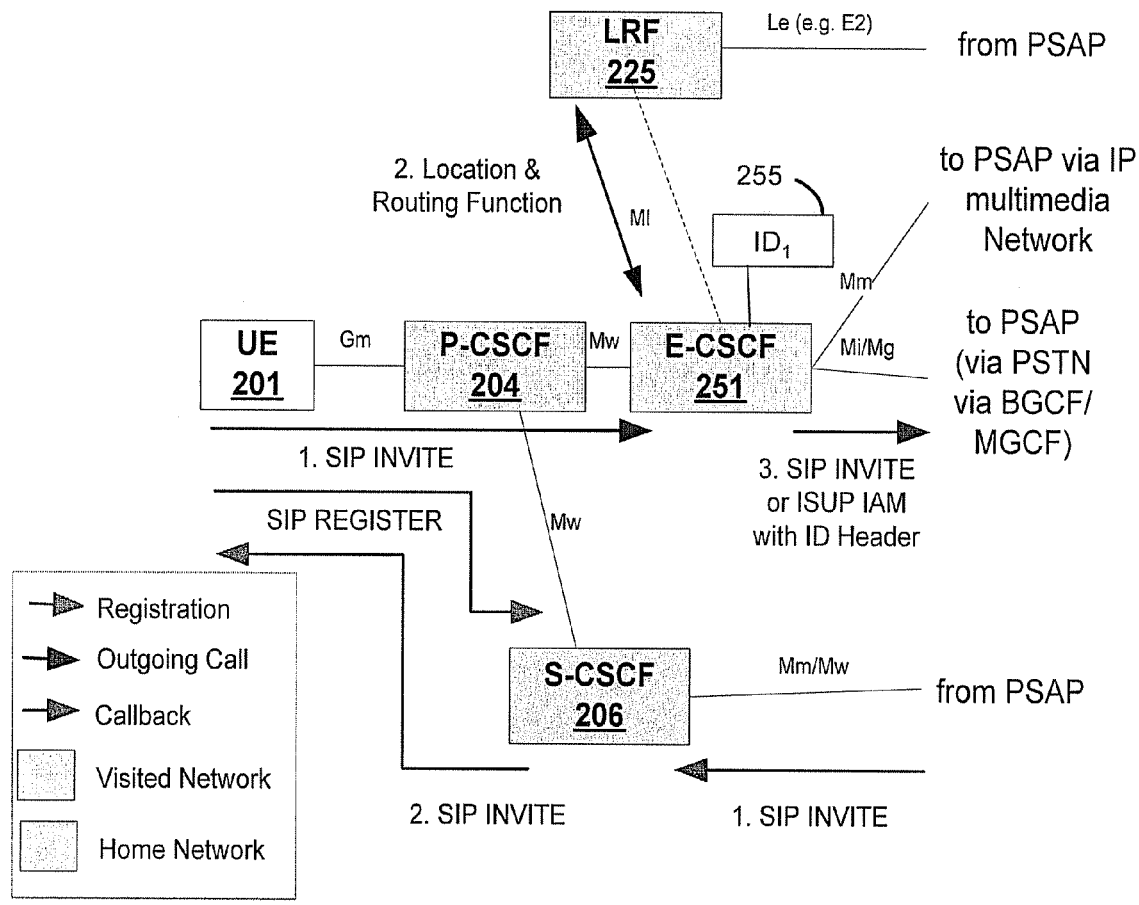

FIG. 2 depicts an illustrative embodiment of a communication system 200. employing an IP Multimedia Subsystem (IMS) network architecture to facilitate the combined services of circuit-switched and packet-switched systems, and to support E911 calls. Communication system 200 can be overlaid or operably coupled with communication system 100 as another representative embodiment of said communication system.

System 200 depicts various components of an IMS-based system that supports E911 calls, including a user end point device 201, a P-CSCF 204 and an S-CSCF 206. Other components not shown in FIG. 2 can also be used with system 200, including ENUM 130 and HSS 140 of FIG. 1. System 200 can include one or more E-CSCFs 251 (only one is shown) for processing of E911 calls. The E-CSCF 251 can be in communication with a Location & Routing Function (LRF) 225. For example, the E-CSCF 251 can contact the LRF 225 to obtain location information and routing information, which can then be used to direct the call to the appropriate PSAP that serves the location where the 911 call is being made. Various invite, ISUP IAM and/or register messages can be utilized to process E911 calls and normal or non-E911 calls by system 200.

In one embodiment, E-CSCF 251 can be provisioned with, or otherwise has access to, an E-CSCF instance identifier 255. The E-CSCF 251 can add its E-CSCF identifier 255 to a header of an SIP INVITE that is forwarded to the BGCF and MGCF so that the E911 call can be confirmed as being received from the appropriate E-CSCF. An E-CSCF identifier 255 can be unique to each of the E-CSCFs of system 200 or can be unique for more than one of the E-CSCFs, including all of the E-CSCFs. For instance, the header can be a service provider's proprietary header, such as X-ATT-ECSCF and can be included in the SIP INVITE messages. The header can carry the E-CSCF ID in an SIP INVITE. The header can be supported by both E-CSCF and MGCF in their implementation. Each of the E-CSCFs can be provisioned with an identifier, such as $ID_1$ of FIG. 3. The identifier can be unique in the entire network. Each MGCF that is capable of handling E911 calls can be provisioned with the identifiers for each of the E-CSCFs. For instance, each time a new E-CSCF is deployed in the NGN network, administrative staff can configure the E-CSCF ID in E-CSCF and in the MGCF; and every time when an E-CSCF is removed from the NGN network, the administrative staff can remove the E-CSCF ID from the MGCF.

Figure 3:
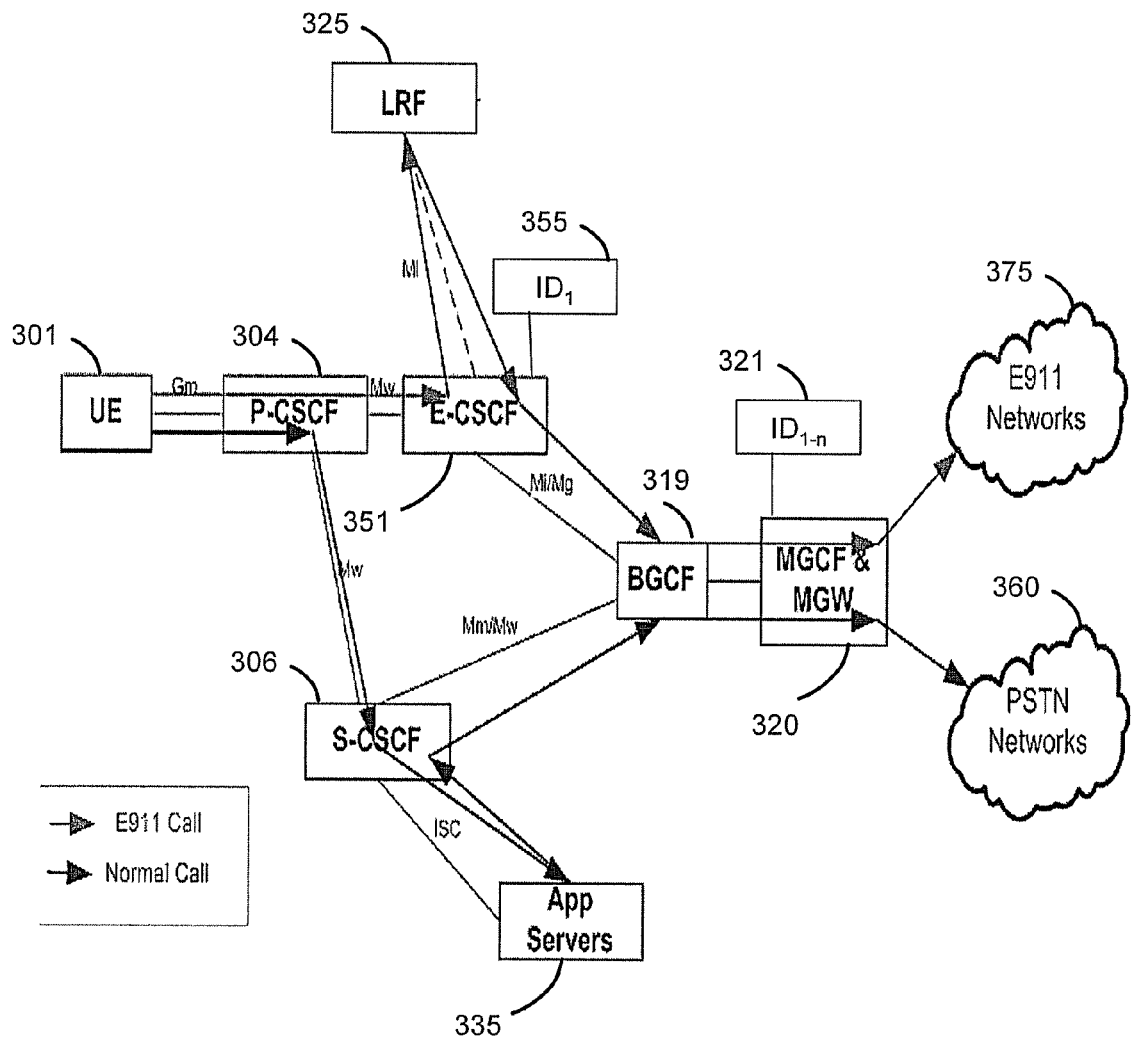

FIG. 3 depicts an illustrative embodiment of a communication system 300. employing an IP Multimedia Subsystem (IMS) network architecture to facilitate the combined services of circuit-switched and packet-switched systems, and to support E911 calls. Communication system 300 can be overlaid or operably coupled with communication system 100 and 200 as another representative embodiment of said communication systems. FIG. 3 depicts signal flow associated with E911 calls and signal flow associated with normal or non-E911 calls. As described below, system 300 provides for confirmation that an E911 call is being received from an appropriate E-CSCF so that the E911 trunks do not become overloaded, such as due to false or otherwise bogus E911 calls.

System 300 depicts various components of an IMS-based system that supports E911 calls, including a user end point device 301, a P-CSCF 304, an S-CSCF 306, a BGCF 319, an MGCF 320 (including MGW), an LRF 325, application servers 335 and an E-CSCF 351. While this exemplary embodiment depicts only one of each of these components, the present disclosure contemplates other numbers and/or configurations of these components. Other components not shown in FIG. 3 can also be used with system 300, including ENUM 130 and HSS 140 of FIG. 1.

E-CSCF 351 can process E911 calls through use of Session Initiation Protocol. The E-CSCF 351 can be provisioned with, or otherwise have access to, one or more E-CSCF identifiers 355, which can be added by the E-CSCF to a header of an SIP INVITE that is then forwarded to the BGCF 319 and MGCF 320 so that the E911 call can be confirmed as being received from the appropriate E-CSCF. The MGCF 320 can be provisioned with, or otherwise have access to, a set of identifiers 321 that includes the E-CSCF identifiers 355 to perform the confirmation. Once confirmed, the MGCF 320 can process the E911 call to an E911 trunk of E911 network 375. An E911 identifier 355 can be unique to each of the E-CSCFs of system 300 or can be unique for more than one of the E-CSCFs, including all of the E-CSCFs. Normal or non-E911 calls can be processed via SIP messaging through the S-CSCF 306, the BGCF 319, and the MGCF 320 to the PSTN network 360.

Figure 4A:
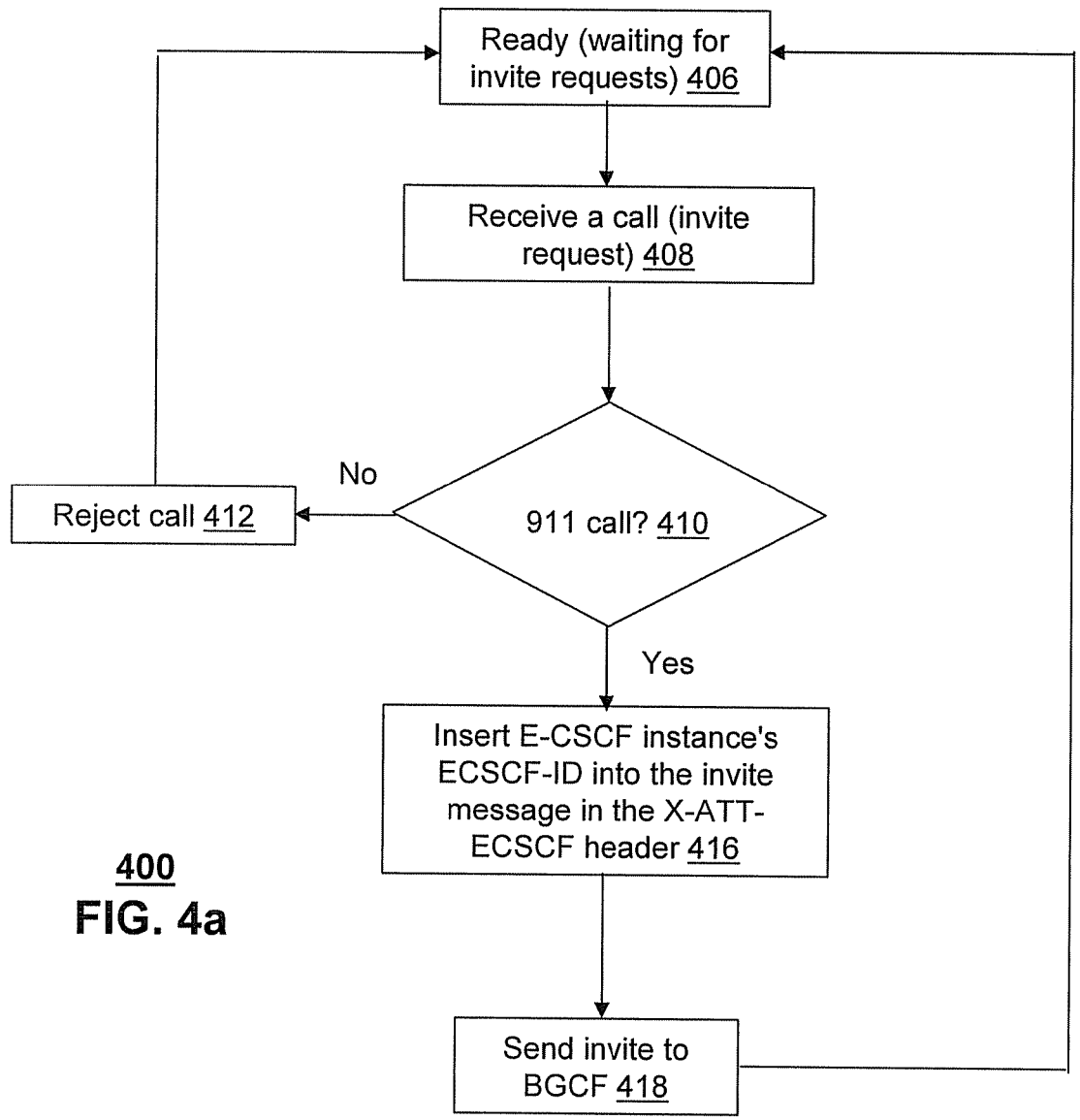
FIGS. 4a and 4b depict illustrative embodiments of methods operating in portions of the communication systems of FIGS. 1-3.

FIG. 4a depicts an illustrative method 400 operating in portions of communication systems 100-300. Method 400 can be a process flow for the E-CSCF. Beginning with step 406, a ready state is provided where the process waits for invite requests. In step 408, the process can receive a call or invite request and in step 410 determine if a 911 call has been received. If the call is not a 911 call then in step 412 the call can be rejected and the process can return to its ready state in step 406. If on the other hand the call is a 911 call then in step 416, the E-CSCF can insert the E-CSCF instance's E-CSCF-ID into the SIP INVITE message in the header. The E-CSCF can then send the SIP INVITE message towards the MGCF by way of the BGCF in step 418.

Figure 4B:
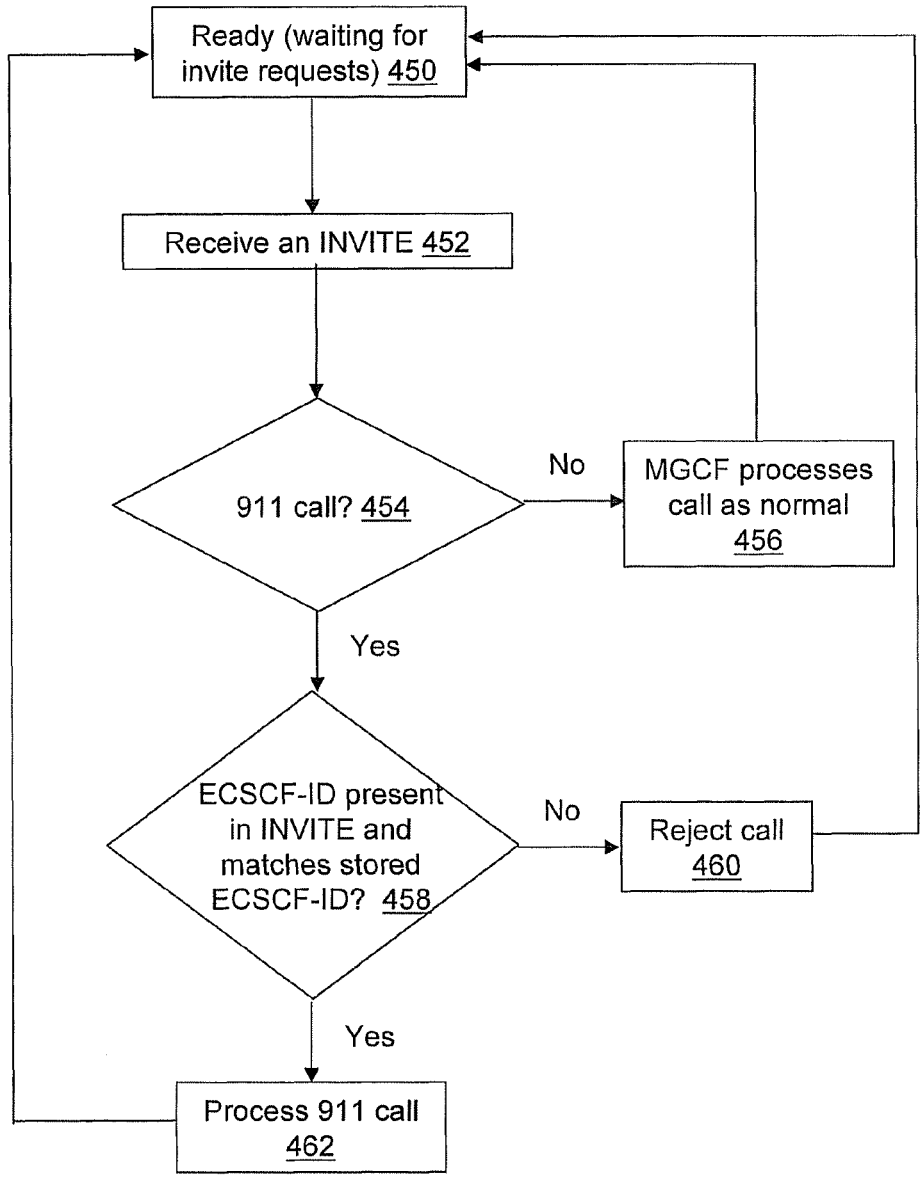

FIG. 4b depicts an illustrative method 401 operating in portions of communication systems 100-300. Method 401 can be a process flow for the MGCF. Beginning with step 450, a ready state is provided where the process waits for invite requests. In step 452, the process can receive an INVITE and in step 454 determine if the call is a 911 call. If the call is not a 911 call then in step 456 the MGCF processes the call as normal. If on the other hand the call is a 911 call then in step 458, the process can determine if an E-CSCF-ID is present in the INVITE and whether it matches a stored E-CSCF-ID. If the appropriate E-CSCF-ID is not present then in step 460 the call can be rejected. If on the other hand the appropriate E-CSCF-ID is present then in step 462 the call can be processed as a 911 call.

The exemplary embodiments allow the MGCF to confirm or otherwise determine that the 911 call was received from an E-CSCF, rather than from other call servers (such as from a S-CSCF where the call was incorrectly identified as an E911 call due to a corrupted profile or the like or due to a malicious attack on the system). In one embodiment, where the MGCF rejects the SIP request based on the lack of the header or the lack of a known identifier associated with an E-CSCF, then the MGCF or another device can monitor for such rejections. An alarm or other notice can be provided, such as to a system or network administrator, where a number of rejections satisfies an alarm threshold. For instance, an alarm can be sent to the administrator when a predetermined number of false E911 calls (such as rejected requests in step 416) are generated by the same user end point device. Other factors for generating the alarm can also be utilized, including a predetermined number of false E911 calls from a geographic region or over a specified time from one or more user end point devices.

Upon reviewing the aforementioned embodiments, it would be evident to an artisan with ordinary skill in the art that said embodiments can be modified, reduced, or enhanced without departing from the scope and spirit of the claims described below. For example, the provisioning of the E911 identifiers to each of the E-CSCFs and the MGCF that handles E911 calls can be done dynamically. For instance, topology information can be monitored so that the MGCF is automatically provisioned with E911 identifiers based on a current topology of the network. Where an E-CSCF is added or removed (or not functioning), the MGCF can be made aware of this information and can be provided with the corresponding E911 identifier, such as through a monitoring server operably coupled to the E-CSCFs and the MGCF. In one embodiment, a source of false or bogus E911 calls can be determined, such as by the MGCF, and communicated to a network administrator.

In another embodiment, the E911 identifiers can be dynamic. For example, an E-CSCF can be associated with a group of E911 identifiers. The MGCF can be provisioned with the entire group of E-911 identifiers. The particular E911 identifier within the group that is utilized for a given E911 call can be changed based on a particular factor (including an encryption key, sequentially, etc.), which is known to the MGCF, to reduce or prevent malicious attacks.

Other suitable modifications can be applied to the present disclosure without departing from the scope of the claims below. Accordingly, the reader is directed to the claims section for a fuller understanding of the breadth and scope of the present disclosure.

Figure 5:
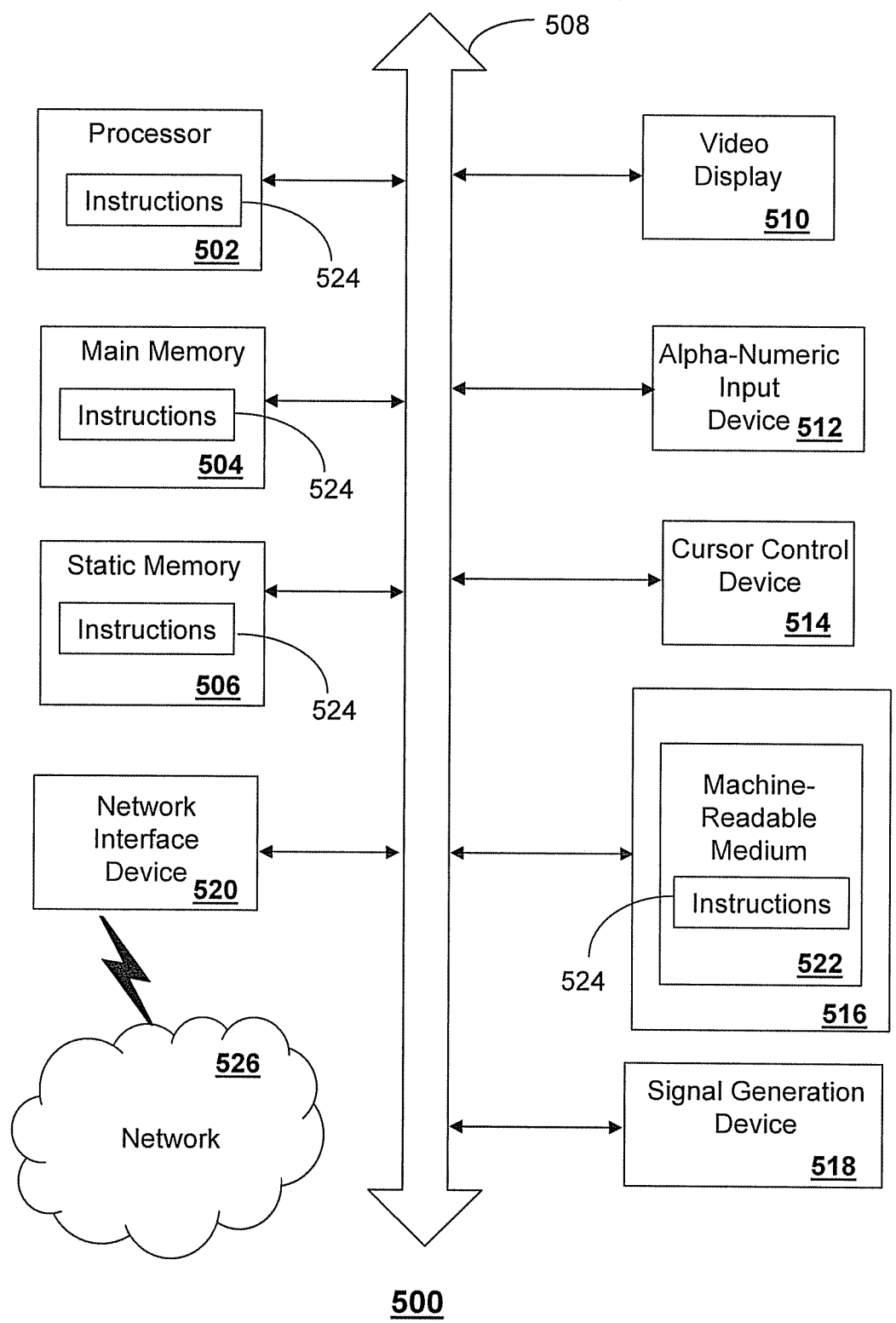
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An article of manufacture comprising computer readable instructions that, when executed by a processor, cause a machine to perform operations including:
   receiving, at a Media Gateway Control Function, a session initiation protocol INVITE associated with a call;
   determining whether the session initiation protocol INVITE has a header associated with emergency calls;
   determining whether the header includes an Emergency Call Session Control Function identifier provisioned in the Emergency Call Session Control Function and added to the header by the Emergency Call Session Control Function, the Emergency Call Session Control Function identifier being unique to the Emergency Call Session Control Function; and
   providing the call to an emergency network when the Emergency Call Session Control Function identifier is in the header.

2. The article of manufacture of claim 1, wherein the instructions further cause the machine to determine whether the call is an E911 call.

3. The article of manufacture of claim 1, wherein the instructions further cause the machine to reject the session initiation protocol INVITE when the session initiation protocol INVITE does not have the header associated with the emergency calls.

4. The article of manufacture of claim 3, wherein the instructions further cause the machine to reject the session initiation protocol INVITE when the header associated with the emergency calls does not include the Emergency Call Session Control Function identifier.

5. The article of manufacture of claim 1, wherein the instructions further cause the machine to:
reject the session initiation protocol INVITE when the header associated with the emergency calls does not include the Emergency Call Session Control Function identifier;
monitor for rejections; and
provide a notification when the monitored rejections satisfy an alarm threshold.

6. The article of manufacture of claim 1, wherein the instructions further cause the machine to store one or more Emergency Call Session Control Function identifiers associated with a plurality of Emergency Call Session Control Functions of an Internet Protocol Multimedia Subsystem network.

7. The article of manufacture of claim 1, wherein the session initiation protocol INVITE is received from a Breakout Gateway Control Function.

8. The article of manufacture of claim 1, wherein the instructions further cause the machine to:
reject the session initiation protocol INVITE when the session initiation protocol INVITE does not have the header associated with the emergency calls;
monitor for rejections; and
provide a notification when the monitored rejections satisfy an alarm threshold.

9. A network element comprising:
a memory including machine readable instructions; and
a processor to execute the instructions to:
determine whether a session initiation protocol request includes an Emergency Call Session Control Function identifier added to a header by an Emergency Call Session Control Function, the Emergency Call Session Control Function identifier being unique to the Emergency Call Session Control Function; and
provide a call to an emergency network when the Emergency Call Session Control Function identifier is in the header.

10. The network element of claim 9, wherein the processor is to:
store a plurality of Emergency Call Session Control Function identifiers; and
determine whether the session initiation protocol request includes the Emergency Call Session Control Function identifier by comparing the Emergency Call Session Control Function identifier with the plurality of Emergency Call Session Control Function identifiers.

11. The network element of claim 9, wherein the header is associated with emergency calls, and the processor is to reject the session initiation protocol request when the session initiation protocol request does not have the header associated with the emergency calls.

12. The network element of claim 11, wherein the processor is to reject the session initiation protocol request when the header associated with the emergency calls does not include the Emergency Call Session Control Function identifier.

13. The network element of claim 12, wherein the processor is to:
monitor for rejections; and
provide a notification when the monitored rejections satisfy an alarm threshold.

14. An Emergency Call Session Control Function network element comprising:
a memory including machine readable instructions; and
a processor to execute the instructions to:
access a session initiation protocol request associated with a call, the session initiation protocol request received from a Proxy Call Session Control Function;
add an identifier to the session initiation protocol request, the identifier to uniquely identify the Emergency Call Session Control Function network element; and
provide the session initiation protocol request with the identifier to a Breakout Gateway Control Function, the call to be provided to an emergency network based on a recognition of the identifier.

15. The Emergency Call Session Control Function network element of claim 14, wherein the identifier is added to a header of the session initiation protocol request, the header being associated with emergency calls.

16. The Emergency Call Session Control Function network element of claim 14, wherein the recognition of the identifier is to be performed by a Media Gateway Control Function of an Internet Protocol Multimedia Subsystem network.

17. The Emergency Call Session Control Function network element of claim 14, wherein the processor is to obtain location and routing information from a Location and Routing Function of the Internet Protocol Multimedia Subsystem network.

18. The Emergency Call Session Control Function network element of claim 14, wherein the identifier is from a plurality of identifiers associated with the network element and accessible by the processor, and the processor is to select one identifier from among the plurality of identifiers.

19. A communication device:
a memory including machine readable instructions; and
a processor to execute the instructions to:
register with a Proxy Call Session Control Function using a session initiation protocol request to communicate with an emergency network, an Emergency Call Session Control Function identifier provisioned in an Emergency Call Session Control Function added to the session initiation protocol request by the Emergency Call Session Control Function, the Emergency Call Session Control Function identifier unique to the Emergency Call Session Control Function, and the call to be provided to the emergency network based on a recognition of the Emergency Call Session Control Function identifier by a Media Gateway Control Function.

20. The communication device of claim 19, wherein the Media Gateway Control Function is to store a plurality of Emergency Call Session Control Function identifiers associated with a plurality of Emergency Call Session Control Functions of the Internet Protocol Multimedia Subsystem network.

21. A method, comprising:
associating, by executing an instruction with a processor, an identifier with an Emergency Call Session Control Function, the identifier unique to the Emergency Call Session Control Function;
provisioning, by executing an instruction with the processor, a Media Gateway Control Function with the identifier; and
providing, by executing an instruction with the Emergency Call Session Control Function, a call to an emergency network when the Emergency Call Session Control Function adds its provisioned identifier in a session initiation protocol INVITE associated with the call.

22. The method of claim 21, further including provisioning the Emergency Call Session Control Function with the identifier and using the Emergency Call Session Control Function to add the identifier to a header of the session initiation protocol INVITE.

23. The method of claim 22, further including:
rejecting the session initiation protocol INVITE when the header associated with the emergency call does not include the identifier;
monitoring for rejections; and
providing a notification when the monitored rejections satisfy an alarm threshold.

24. The method of claim 21, further including:
rejecting the session initiation protocol INVITE when the session initiation protocol INVITE does not include the identifier;
monitoring for rejections; and
providing a notification when the monitored rejections satisfy an alarm threshold.

25. The method of claim 21, further including determining whether the call is an E911 call.

* * * * *